UNITED STATES PATENT OFFICE.

WILLIAM H. BOWDLEAR, OF BOSTON, MASSACHUSETTS.

FLOOR-WAX.

SPECIFICATION forming part of Letters Patent No. 613,750, dated November 8, 1898.

Application filed January 31, 1898. Serial No. 668,629. (No specimens.)

*To all whom it may concern:*

Be it known that I, WILLIAM H. BOWDLEAR, a citizen of the United States, residing in Boston, in the county of Suffolk and State of Massachusetts, have invented a new and useful Composition of Matter to be Used in Preparing Floors for Dancing, of which the following is a specification.

My composition consists of the following ingredients, combined in substantially the proportions stated, viz: carnauba-wax, sixty per centum in weight; laurel-wax, twenty per centum in weight; refined paraffin-wax, twenty per centum in weight.

The names above given of the ingredients are those by which they are commercially known, the carnauba-wax and laurel-wax being vegetable waxes and the paraffin-wax being a mineral wax.

The ingredients are weighed and placed in a vessel and melted by the application of heat and then mixed and cooled. After the composition has become sufficiently cooled it is ground or pulverized, so that it may be easily spread over a floor in order to render its surface suitable for dancing.

There is danger in applying ordinary floor-wax that the surface may become so slippery as to be unsafe.

It is the object of this invention to produce a composition which will render the floor sufficiently smooth and yet provide just enough frictional capacity to make it easy and safe for dancing purposes. This is accomplished by the combination of the above ingredients more particularly in the proportions specified.

What I claim, and desire to secure by Letters Patent of the United States, is—

1. The herein-described composition of matter, consisting of carnauba-wax, laurel-wax, and refined paraffin-wax, substantially as described and for the purpose specified.

2. The herein-described composition of matter, consisting of carnauba-wax sixty per centum in weight, laurel-wax twenty per centum in weight, and refined paraffin-wax twenty per centum in weight, substantially as described and for the purpose specified.

WILLIAM H. BOWDLEAR.

Witnesses:
 HENRY W. WILLIAMS,
 A. N. BONNEY.